United States Patent Office 2,785,211
Patented Mar. 12, 1957

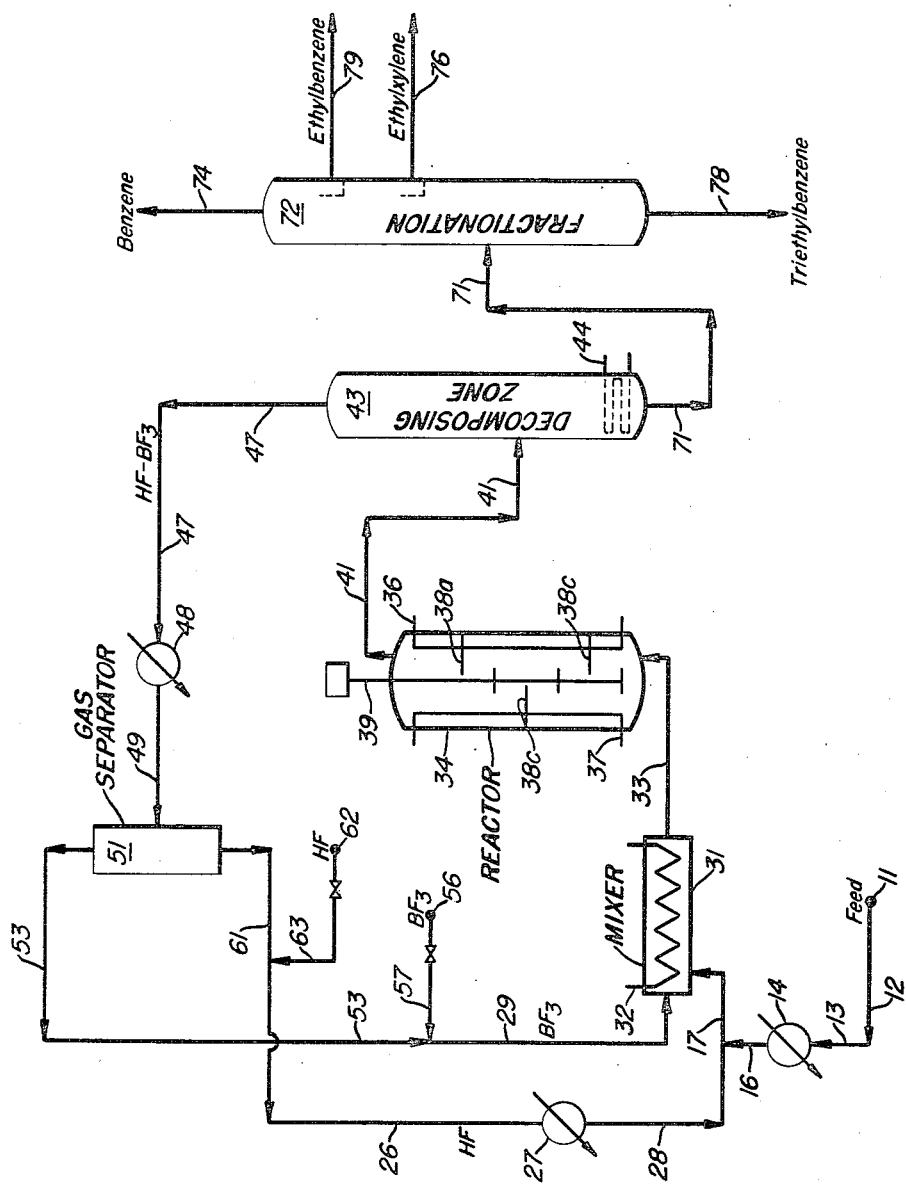

2,785,211

SEPARATION OF 1 ETHYL 3,5 DIMETHYL BENZENE FROM DIETHYL BENZENE BY DISPROPORTIONATING THE LATTER IN THE PRESENCE OF HF-BF$_3$

David A. McCaulay, Chicago, Ill., and Arthur P. Lien, Highland, Ind., assignors to Standard Oil Company, Chicago, Ill., a corporation of Indiana Application November 13, 1953, Serial No. 391,997

3 Claims. (Cl. 260—674)

This is a continuation-in-part of our co-pending application Serial No. 334,614, filed February 2, 1953, now Patent No. 2,753,386.

This invention relates to the separation of C$_{10}$ alkylbenzene hydrocarbons. Particularly, the invention relates to the separation of diethylbenzene from 1-ethyl-3,5-dimethylbenzene.

In the treatment of a feed containing xylene isomers as substantially the only polyalkylbenzenes and ethylbenzene with liquid HF-BF$_3$ agent to effect a physical separation of the C$_8$ aromatic hydrocarbons into an m-xylene-rich fraction and a p- and/or o-xylene-ethylbenzene-rich fraction, some of the ethylbenzene reacts to form a mixture of m-diethylbenzene and 1-ethyl-3,5-dimethylbenzene. These latter C$_{10}$ alkylbenzenes cannot be resolved readily by distillation. The ethylxylene cannot be used as a source of vinylxylene because the divinylbenzene by-product prevents the formation of a polymer of satisfactory characteristics because the divinylbenzene acts as a cross-linking agent; therefore, the mixture of diethylbenzene and ethylxylene is suitable chiefly as a solvent naphtha and as a constituent of gasoline.

An object of this invention is the separation of diethylbenzene from 1-ethyl-3,5-dimethylbenzene, i. e., 1,3,5-ethylxylene. Another object is the treatment of a mixture of diethylbenzene and 1,3,5-ethylxylene to produce a 1,3,5-ethylxylene fraction of purity suitable for polyvinylxylene manufacture, i. e., having about 0.5% or less diethylbenzene contaminant. Other objects will become apparent in the detailed description of the invention.

A mixture comprising essentially diethylbenzene and ethylxylene is resolved into fractions consisting essentially of ethylxylene, triethylbenzene, ethylbenzene and benzene by treating said mixture with between about 3 and 50 mols of liquid HF and between about 1 and 5 mols, preferably 1.1 to 2 mols, of BF$_3$, respectively, per mol of polyalkylbenzene in said mixture. The treatment is carried out at a temperature between about —20° and +135° C. for a time sufficient to permit the conversion of the diethylbenzene to triethylbenzene. An ethylxylene fraction, essentially free of diethylbenzene, is recovered from the product hydrocarbon mixture after the removal of the HF and BF$_3$.

The feed to the process may be a mixture of diethylbenzene isomers and ethylxylene isomers. Small amounts of aromatic hydrocarbons boiling close to ethylxylene may also be present. The presence of paraffinic hydrocarbons in amounts greater than about 2–3 volume percent in the feed is undesirable, when maximum conversion of diethylbenzene is desired. It is preferred to use as the feed to the process a mixture of m-diethylbenzene and 1,3,5-ethylxylene derived from the treatment of a mixture of xylene and ethylbenzene with liquid HF-BF$_3$ agent as for example in the separation of m-xylene from a naturally occurring C$_8$ aromatic hydrocarbon mixture by the use of the liquid HF-BF$_3$ agent.

The BF$_3$ usage is at least about 1 mol per mol of polyalkylbenzene in the feed, for example 0.9 mol; as much or more than 5 mols may be used. Better results are obtained when at least 1 mol of BF$_3$ is used per mol of polyalkylbenzene in the feed. It is preferred to use between about 1.1 and 2 mols of BF$_3$ per mol of polyalkylbenzene in the feed.

The process is carried out under substantially anhydrous conditions. The liquid hydrogen fluoride should contain not more than about 2 or 3% of water. Commercial grade anhydrous hydrofluoric acid is suitable for this process.

The amount of liquid HF used must be somewhat more than 1 mol per mol of polyalkylbenzene in the feed. Generally, between about 3 and 50 mols of liquid HF are used. It is preferred to use between about 5 and 20 mols of liquid HF per mol of polyalkylbenzene in the feed.

A feed comprising essentially diethylbenzene and ethylxylene as the aromatic hydrocarbons and as much as about 3 volume percent of paraffins will pass essentially completely into the acid phase when contacted with the defined amounts of liquid HF and BF$_3$. This condition is spoken of herein as an essentially single homogeneous phase. (It is to be understood that a separate gaseous BF$_3$ phase may also be present, but it is preferred that a minimum of free space be present in the contacting zone and that sufficient pressure be maintained to insure that essentially all the BF$_3$ is either in the complexed form or is in physical solution in the acid phase.) The presence of a separate hydrocarbon raffinate phase has an adverse effect on ethylxylene purity; it is preferred to operate with an essentially single homogeneous phase in the reaction zone.

The process is carried out at a temperature between about —20° C. and about +135° C. Operation at lower temperatures retards the diethylbenzene conversion unless long contacting times are used. Operation above +135° C. results in the presence of significant amounts of side reactions such as cracking and ring-condensation. It is preferred to operate at a temperature between about +15° C. and +50° C.

When operating the process at the preferred temperature range, the time of contacting should be between about 15 and 60 minutes, the longer times corresponding to the lower temperatures. At higher temperatures, the time should be decreased, for example, at about +125° C., the time should be about 5 minutes. The time should be increased at the lower temperatures, for example, at —40° C., the time should be about 4 hours.

The reaction product mixture may be recovered from the acid phase by various methods. Probably the simplest procedure and one most suitable for laboratory work consists of adding the acid phase to crushed ice; or the acid phase may be contacted with cold aqueous alkaline solution, such as sodium hydroxide, potassium hydroxide and ammonia. It is desirable to prevent rearrangement reactions by the use of a cold aqueous reagent.

The hydrocarbons originally present in the acid phase appear as an upper oil layer above a lower aqueous layer. The upper oil layer may be separated by decantation and may be treated with dilute aqueous alkaline solution to remove any remaining HF and BF$_3$ occluded therein.

Both HF and BF$_3$ are relatively expensive chemicals and it is desirable in an economic process to recover these and to recycle them for reuse in the process. The HF and the BF$_3$ may be readily removed from the acid phase by heating the acid phase or by applying a vacuum thereto. The HF and the BF$_3$ distill overhead and may be recovered for reuse in the process. When dialkylbenzenes and/or trialkylbenzenes are the principal complex-forming hydrocarbons, the complex may be decomposed at relatively low temperatures by the use of vacuum distillation. The distillative decomposing zone may be operated at temperatures as low as about −20° C. by the use of high vacuum therein. It is preferred to operate at temperatures of +60° C., or lower.

The annexed figure, which forms a part of this specification, shows an illustrative embodiment of a method of carrying out the invention to produce essentially pure 1,3,5-ethylxylene by treating a feed consisting of diethylbenzene and 1,3,5-ethylxylene obtained by HF-BF₃ extraction of a C₈ aromatic hydrocarbon mixture. The figure is schematic and many items of equipment have been omitted, such as pumps, valves, etc., as these may be readily added thereto.

Feed from source 11 is passed by way of lines 12 and 13 into heat exchanger 14. From exchanger 14 the feed is passed by way of line 16 into line 17.

Anhydrous liquid hydrogen fluoride, 7 mols/mol of charge, is passed from line 26, through heat exchanger 27 and line 28 into line 17. Heat exchangers 14 and 27 raise the temperature of the charge and the liquid HF to a temperature of about +40° C. This temperature is about 10° C. lower than the desired reaction temperature of +50° C.

The contents of line 17 are introduced into mixer 31 which is provided with heat exchanger means 32. BF₃, 1.3 mols/mol of charge, from line 29 is introduced into mixer 31. Mixer 31 is an apparatus able to rapidly intermingle the charge, liquid HF and BF₃. The heat exchanger means 32 withdraws the heat given off by the complex formation and prevents the temperature at the discharge end of mixer 31 rising above +50° C.

An acid phase consisting of liquid HF, dissolved complex, hydrocarbons and BF₃ is discharged from mixer 31. About 200 p. s. i. g. of pressure are maintained on the system to keep the excess BF₃ in the acid phase. The mixture is passed from mixer 31 by way of line 33 into reactor 34.

Reactor 34 is provided with heat exchanger means 36 and 37. To insure the maintenance of a substantially uniform temperature of +50° C. throughout the reactor, reactor 34 is provided with baffles 38a, 38b and 38c and motor driven agitator means 39.

A single acid phase is withdrawn from the top of reactor 34 and is passed by way of line 41 into decomposing zone 43. The rearrangement reaction starts as soon as the HF, BF₃, and diethylbenzene are mixed and continues until the HF and BF₃ are distilled from the acid phase. Therefore, the contacting time is measured as the time in mixer 31, reactor 34 and part of the total time in decomposing zone 43. In this embodiment, a total time of about 15 minutes is utilized. Under these conditions essentially all the diethylbenzene is converted to benzene, ethylbenzene and triethylbenzene.

Decomposing zone 43 is provided with internal heater 44 and some fractionation means, not shown. The temperature of +50° C. at about atmospheric pressure in zone 43 is high enough to readily decompose the HF-BF₃ complexes but not high enough to cause appreciable further disproportionation to tetralkylbenzenes.

HF vapor and BF₃ gas are withdrawn from zone 43 and passed by way of line 47 into heat exchanger 48. In heat exchanger 48 the HF vapors are condensed and a liquid-gas stream is passed by way of line 49 into gas separator 51. BF₃ is withdrawn from gas separator 51 and is recycled by way of lines 53 and 29 to mixer 31. Make-up BF₃ is introduced from source 56 by way of valved line 57 into line 53. Liquid HF is recycled by way of lines 61 and 26. Make-up HF is introduced from source 62 by way of valved line 63 into line 61.

The bottoms fraction from decomposing zone 43 consists of ethylbenzene, triethylbenzene, ethylxylene and benzene. The bottoms fraction is withdrawn and introduced by way of line 71 into fractionation zone 72, shown schematically herein. A benzene fraction is withdrawn to storage by way of line 74. A product fraction consisting essentially of pure 1,3,5-ethylxylene is passed to storage by way of line 76. A bottoms fraction of triethylbenzene is withdrawn by way of line 78. An ethylbenzene fraction is withdrawn and passed to storage by way of line 79.

In order to show the results obtainable by this process in a single-stage batchwise operation the following experimental run is described.

This run was carried out in a carbon steel reactor provided with a 1725 R. P. M. stirrer. In this run the liquid feed consisting of m-diethylbenzene, 1,3,5-ethylxylene and n-heptane was added to the reactor. Then the liquid HF was charged into the reactor and finally BF₃ from a cylinder was charged into the reactor. The charge to the reactor consisted of:

|  | ml. | Mols |
|---|---|---|
| m-Diethylbenzene | 100 | 0.65 |
| 1,3,5-Ethylxylene | 100 | 0.63 |
| n-Heptane | 200 |  |
| HF (0.5% water) | 400 | 20 |
| BF₃ |  | 0.69 |

The contents of the reactor were maintained at 18° C. and agitated for 60 minutes. At the end of this time the contents of the reactor were settled for 10 minutes. Two liquid phases were found to be present in the reactor and each phase was withdrawn into a separate receiver. Each liquid phase with withdrawn into a vessel filled with crushed ice. Decomposition of the complexes by the water resulted in the formation of a lower aqueous layer and an upper hydrocarbon layer. The hydrocarbon layer was washed with dilute aqueous ammonia to remove HF and BF₃ and was then water washed to remove traces of the aqueous ammonia.

The raffinate and extract hydrocarbons were fractionated in a laboratory column providing about 30 theoretical plates. The various cuts were analyzed by a combination of specific gravity, boiling point, refractive index and infrared techniques. The product distribution of the aromatic constituents of the raffinate and extract phases were:

| Product Distribution, Mols | Raffinate | Extract | Total |
|---|---|---|---|
| Ethylbenzene | 0.09 | .04 | .13 |
| Diethylbenzene | 0.41 | .00 | .41 |
| 1,3,5-Ethylxylene | 0.07 | .57 | .64 |
| Triethylbenzene | 0.03 | .08 | .11 |
| Total | 0.60 | .69 | 1.29 |

The analyses showed that the diethylbenzene fraction was essentially the m-isomer and the ethylxylene was essentially the 1,3,5-isomer.

In this run only 37% of the diethylbenzene was disproportionated owing to the use of BF₃ in an amount only slightly in excess of that needed, theoretically, to complex the ethylxylene. Despite this low usage, the extract phase contained no diethylbenzene, i. e., the ethylxylene fraction was pure 1,3,5-ethylxylene.

Operation on this feed, in the absence of heptane, with about 1.1 mol of BF₃ per mol of C₁₀ aromtaic hydrocarbon, would produce a product mixture consiting of benzene, triethylbenzene, ethylxylene and some ethylbenzene—essentially all the diethylbenzene would be converted.

Thus having described the invention, what is claimed is:
1. A process which comprises contacting, under substantially anhydrous conditions, a feed consisting essentially of meta diethylbenzene and 1-ethyl-3,5-dimethyl benzene, with at least enough liquid HF to form a distinct separate acid phase and with at least 1 mol of BF₃ per mol of polyalkylbenzene in said feed, at a temperature between about −20° and +135° C. for a time at least sufficient to convert substantially all of said diethylbenzene and recovering from said acid phase a $C_{10}$ aromatic hydrocarbon fraction which consists essentially of 1-ethyl-3,5-dimethyl benzene.

2. The process of claim 1 wherein said temperature is between about +15° and +50° C.

3. A process which comprises contacting, under substantially anhydrous conditions, a feed consisting essentially of meta diethylbenzene and 1-ethyl-3,5-dimethyl benzene, with between about 5 and 20 mols of liquid HF and between 1.1 and 2 mols of $BF_3$, respectively, per mol of polyalkylbenzene, at a temperature between about +15° C. and about +50° C. for a time sufficient to convert essentially all of said diethylbenzene said time is between about 15 minutes and about 60 minutes, the longer times corresponding to the lower temperatures, and removing HF and $BF_3$ to recover a mixture of hydrocarbons containing a $C_{10}$ aromatic hydrocarbon fraction consisting essentially of 1-ethyl-3,5-dimethyl benzene.

References Cited in the file of this patent
UNITED STATES PATENTS

| | | |
|---|---|---|
| 2,528,892 | Lien et al. | Nov. 7, 1950 |
| 2,564,073 | Lien et al. | Aug. 14, 1951 |
| 2,644,017 | McCaulay et al. | June 30, 1953 |
| 2,683,760 | McCaulay et al. | July 13, 1954 |